US008700698B2

(12) United States Patent
Marcjan et al.

(10) Patent No.: US 8,700,698 B2
(45) Date of Patent: Apr. 15, 2014

(54) SCALABLE AFFINITIZED STATE MANAGEMENT

(75) Inventors: Cezary Marcjan, Redmond, WA (US); Todd D. Newman, Mercer Island, WA (US); David S. Taniguchi, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1016 days.

(21) Appl. No.: 12/773,116

(22) Filed: May 4, 2010

(65) Prior Publication Data

US 2011/0276884 A1 Nov. 10, 2011

(51) Int. Cl.
*G06F 15/16* (2006.01)
(52) U.S. Cl.
USPC ............ 709/203; 709/220; 709/228; 707/616
(58) Field of Classification Search
USPC .............. 709/203, 220, 228; 710/18; 707/616
See application file for complete search history.

(56) References Cited

U.S. PATENT DOCUMENTS

| 7,246,240 | B2 * | 7/2007 | Chuang et al. ................ 713/176 |
| 7,275,249 | B1 * | 9/2007 | Miller et al. ................... 718/105 |
| 7,664,879 | B2 | 2/2010 | Chan et al. |
| 7,917,717 | B2 * | 3/2011 | Lomnes ........................ 711/163 |
| 8,001,079 | B2 * | 8/2011 | Lu et al. ........................ 707/616 |
| 2003/0069889 | A1 * | 4/2003 | Ofek ............................. 707/100 |
| 2003/0229817 | A1 | 12/2003 | Colasurdo et al. |
| 2006/0212607 | A1 * | 9/2006 | Riethmuller ..................... 710/6 |
| 2008/0127232 | A1 | 5/2008 | Langen et al. |
| 2009/0100289 | A1 | 4/2009 | Chen et al. |
| 2009/0172212 | A1 * | 7/2009 | Stanton ........................... 710/18 |
| 2009/0222498 | A1 * | 9/2009 | Lu et al. ........................ 707/204 |
| 2013/0148791 | A1 * | 6/2013 | Earnshaw et al. .......... 379/88.01 |

OTHER PUBLICATIONS

"Preserving Session State in Network Load Balancing Web Server Clusters ", Retrieved at << http://www.microsoft.com/technet/prodtechnol/WindowsServer2003/Library/IIS/77cb4318-75f8-4310-a05f-3605b5768007.mspx >>, Apr. 24, 2008, p. 1.
Bromberg, Peter A. "Network Load Balancing, Session State and IP Affinity", Retrieved at << http://www.eggheadcafe.com/articles/20020302.asp >>, Jul. 15, 2008, pp. 2.

(Continued)

*Primary Examiner* — Khanh Dinh
(74) *Attorney, Agent, or Firm* — Dan Choi; Carole Boelitz; Micky Minhas

(57) ABSTRACT

A state affinitized system comprises worker computing devices uniquely affinitized with one or more states such that only those worker computing devices maintain local copies of the states with which they are affinitized. Requests and data relevant to a state are directed to the worker computing device affinitized with that state, such as by front-end computing devices. A centralized persistent storage can maintain a copy of each state and can modify the states in response to newly received information in the same manner as the worker computing devices. Such maintenance can be performed by coalescer computing devices, which can also derive second order data from the states in the centralized persistent storage, which can be further added to the state and also communicated to the worker computing device affinitized with that state. Crawler computing devices can obtain additional information for incorporation into states from network-based information repositories and services.

20 Claims, 11 Drawing Sheets

(56) References Cited

OTHER PUBLICATIONS

"Network Load Balancing Technical Overview", Retrieved at << http://technet.microsoft.com/en-us/library/bb742455.aspx >>, Apr. 9, 2008, pp. 19.

Martynov, et al., "Scaling .NET Web Applications with Microsoft's Project Codenamed "Velocity"", Retrieved at << http://download.microsoft.com/download/1/B/2/1B21D4A1-C84C-4CB8-923A-740BD927CDEB/Velocity%20Benchmark%20White%20Paper.docx >>, Sep. 1, 2009, pp. 61.

* cited by examiner

SCALABLE AFFINITIZED STATE MANAGEMENT

BACKGROUND

Traditionally, interaction between a user and a computing device was based on the computing device's ability to accept data from a user and, in response to the accepted data and computer-executable instructions executing on that computing device, generate one or more responses that would be provided to the user. Thus, the single computing device with which the user was interacting comprised all of the data and all of the computer-executable instructions relevant to processing that data and providing responses, based on the data, to the user.

As networks of computing devices have become ubiquitous, and, more importantly, as network bandwidth and throughput has increased, it has become more practical to enable the interaction between a user and a computing device to be based, at least in part, on data and computer-executable instructions that are resident on another, different, computing device that is separate and apart from the computing device with which the user is interacting, and which is communicationally coupled to that computing device via a network. Thus, for example, a user interacting with one computing device can direct a request to that computing device that will cause actions to ultimately be performed based on data residing on one or more other computing devices, and, indeed, to be performed by computer-executable instructions executing on one or more other computing devices. The results of such computation by one or more other computing devices can then be returned to the computing device with which the user is interacting in order for those results to be presented to the user.

Because of the ability of networked computing devices to perform computations for multiple, remotely located, users, a single networked computing device can be tasked by multiple users such that its ability to perform the requested computations within an acceptable period of time can be negatively impacted. To solve the performance penalty associated with having too many users tasking a single network computing device simultaneously, groups of networked computing devices are traditionally established such that any one computing device from among the group can be utilized to perform the actions requested by the user. A load balancing device can be implemented to monitor the computational load on any one network computing device and direct subsequent requests to those computing devices that are not as taxed. Because any one computing device can be utilized to perform the actions requested by the user, the networked computing devices are, essentially, homogenous in that they either already comprise all of the relevant computer-executable instructions and data necessary to perform the action requested by the user, or they can quickly and efficiently obtain the relevant computer-executable instructions and data necessary to perform the action requested by the user. Absent such homogeneity, traditional load balancing cannot be achieved.

Typically, the storage capacity required to retain computer-executable instructions that can be utilized to respond to user requests can be relatively minimal. For example, even large computer-executable application programs may only comprise a small fraction of the storage capacity of even a minimally equipped networked computing device. Similarly, in many cases, the amount of data required to respond to user requests can likewise be relatively minimal. For example, data enumerating all of the purchases the user has made through a network-based merchant may be sufficiently small that it can be copied from a centralized storage unit to the computing device executing the computer-executable instructions that can determine and generate the user's response within a relatively short time frame. Consequently, each networked computing device can be homogenously established with the relevant computer-executable instructions and with the communicational connection to a centralized storage unit that can retain the data for all users. Subsequently, as user requests arrive, they can be load balanced across the network computing devices and, as each device seeks to respond to a user's request, it can download the relevant data from the centralized storage unit, process it with the computer-executable instructions, and provide a response.

In some situations, however, the amount of data that may need to be accessed in order to respond to a user's request may be so voluminous that it cannot be copied on-the-fly. In such situations, traditional load-balancing cannot work because the homogenous computing devices required for traditional load-balancing would not be able to obtain the necessary data, such as from a centralized storage unit, in a sufficient amount of time to be able to respond to the user's request in a timely manner.

SUMMARY

An affinitization between a computing device and one or more states can be established such that that one particular computing device, exclusively, comprises one or more states to which it is affinitized. A "state" can comprise all relevant data, such as all data associated with a specific user, all data associated with a specific task, or other like amalgamations of data. The "state" can further comprise all relevant and computer-executable instructions, settings, and other like programmatic constructs.

In one embodiment, one or more "worker" computing devices are affinitized with one or more states such that there exists an exclusive affinity between a worker computing device and the one or more states with which it has been affinitized. Requests relevant to a state are forwarded to the specific worker computing device that is affinitized with that particular state.

In another embodiment, a centralized persistent storage maintains all of the states that are also individually locally maintained by those worker computing devices with which the states are affinitized. When data to be added to a state is received, it can be provided to both the worker computing device with which the relevant state is affinitized, and also to the centralized persistent storage.

In yet another embodiment, "crawler" computing devices can establish communications with network-based information repositories and services that can contain data relevant to one or more states, and can obtain such data from such network-based information repositories and services and return it to both the worker computing devices with which the relevant states are affinitized and also to the centralized persistent storage.

In a further embodiment, "coalescer" computing devices can maintain the copies of the states in the centralized persistent storage in the same manner that each worker computing device individually maintains the local copies of the states with which that worker computing device is affinitized. Additionally, the coalescer computing devices can derive further, second order data from the data already existing in the states, and can add such derived second order data to the states maintained in the centralized persistent storage, and also provide such derived second order data to the worker computing devices to add to the local copies of the states with which those worker computing devices are affinitized.

In a still further embodiment, front end computing devices can provide an interface through which one or more users can access the services provided by the worker computing devices.

In a yet further embodiment, a management computing device can maintain the overall efficiency of the worker computing devices, including requesting that one or more states be no longer affinitized with one computing device and, instead, be affinitized with another, different computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
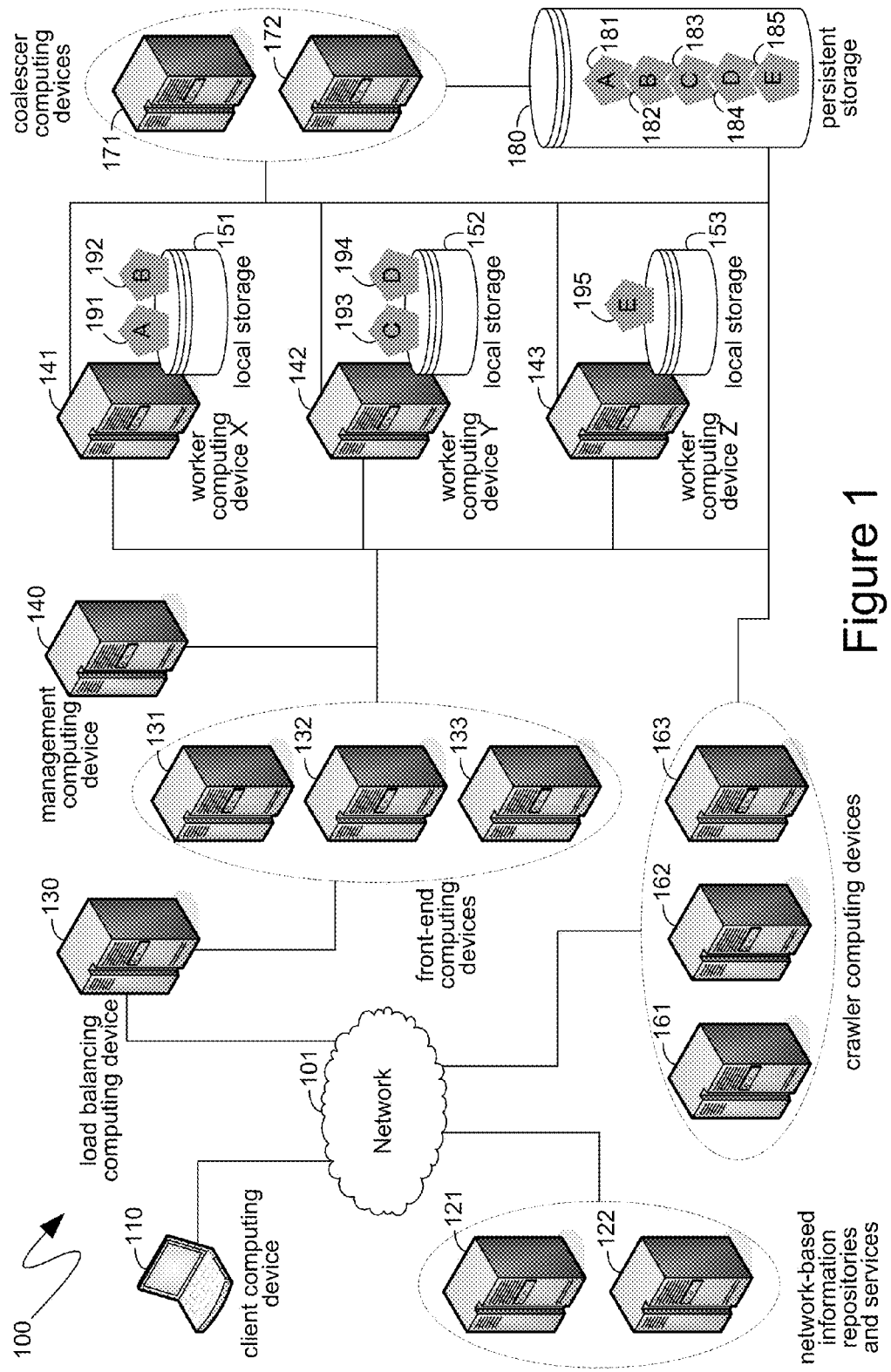
FIG. 1 is a block diagram of an exemplary system comprising state affinitized worker computing device.

The following description relates to a system in which specific computing devices are affinitized with specific states such that processing requiring such states is directed to those specific computing devices. "Worker" computing devices can be affinitized with particular states and requests directed to such states can be forwarded to those worker computing devices via one or more "front-end" computing devices. Additionally, a centralized persistent storage can maintain a centralized copy of each of the states that are also locally maintained by the worker computing devices with which they are affinitized. One or more "crawler" computing devices can obtain information from network-based information repositories and services that is relevant to one or more states, and can provide such obtained information to the worker computing device affinitized with one or more of the relevant states, and also to the centralized persistent storage. Optionally, one or more "coalescer" computing devices can process the states maintained in the centralized persistent storage to mirror processing performed locally by the worker computing devices, and also to derive second-order data, which can then also be added to the states, both centrally maintained and locally maintained by the individual worker computing devices. Also optionally, a "management" computing device can seek to maintain an optimal balance among the worker computing devices and can change which states are affinitized with each worker computing device.

While the below descriptions are directed to the system implementation described, they are not so limited. Specifically, the descriptions are equally applicable to any multi-device system comprised, not of homogeneous computing devices that obtain state information from a centralized source on an individual-operation-basis and then discard it, but rather comprised of state affinitized computing devices that are uniquely affinitized with specific states and to which requests and data associated with such states are directed. As such, the detailed descriptions of the specific system embodiment described are meant to be exemplary, and are not meant to limit the disclosure exclusively to the system components enumerated.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures, where data is maintained, are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, a system 100 is shown, comprising a network 101 and multiple computing devices communicationally coupled thereto. A client computing device 110 can utilize the network 101 to provide data and requests to, and receive information from, a system of computing devices where individual computing devices are affinitized with specific states, including at least one computing device affinitized with the state relevant to the user of the client computing device 110. Also communicationally coupled to the network 101 can be one or more network-based information repositories and services, such as the exemplary network-based information repositories and services computing devices 121 and 122. As will be recognized by those skilled in the art, such network-based information repositories and services can include social networking, photo sharing, online forums, online classifieds, and other like network-based information repositories and services.

One or more "front-end" computing devices, such as the front-end computing devices 131, 132 and 133 can provide the primary interface between the capabilities of the system based on state affinitized computing devices, and users of such a system, such as the user of the client computing device 110. The front-end computing devices 131, 132 and 133 can receive data, including account information and data relevant to a specific state, from the client computing device 110 and provide at least the data relevant to one or more states to back-end computing devices for processing into the relevant states. Additionally, the front-end computing devices 131, 132 and 133 can receive requests from the client computing device 110, can identify the computing device affinitized with the one or more states to which such requests are relevant, and can forward the received requests to those identified state affinitized computing devices. Likewise, the front-end computing devices 131, 132 and 133 can receive responses from the state affinitized computing devices, and can return such responses to client computing device 110.

In one embodiment, a load-balancing computing device 130 can be communicationally interconnected between the client computing device 110 and the one or more front-end computing devices, such as the front-end computing devices 131, 132 and 133. Rather than providing load balancing across the computing devices that can be relevant to responding to a user request requiring access to a user's state, the load-balancing computing device 130 can balance the communicational load of multiple client computing devices, such as the client computing device 110, across the multiple front-end computing devices, such as the front-end computing devices 131, 132 and 133.

The front-end computing devices can be communicationally coupled to one or more "worker" computing devices, such as the worker computing devices 141, 142 and 143, which can be affinitized to one or more unique states, such as the states 191, 192, 193, 194 and 195. For example, in the exemplary illustrated system 100 of FIG. 1, a worker computing device 141 can be affinitized with two states, namely states 191 and 192, which can be retained on a local storage 151 that is local to the worker computing device 141. Similarly, in the exemplary illustrated system 100 FIG. 1, the worker computing device 142 can also be affinitized with two states, namely states 193 and 194, which can be retained on a local storage 152 that is local to the worker computing device 142, and the worker computing device 143 can, likewise, be affinitized with a state, namely state 195, which can also be retained on a local storage 153 that is local to the worker computing device 143.

In addition to the states that are locally maintained by the worker computing devices with which such states are affinitized, one or more states can also be centrally maintained in the persistent storage 180 that can be communicationally coupled to the worker computing devices 141, 142 and 143. Thus, as shown in the exemplary system 100 of FIG. 1, the persistent storage 180 can comprise copies of the states 191, 192, 193, 194 and 195 which are numbered 181, 182, 183, 184 and 185, respectively. As explained, the maintenance, by the worker computing devices, such as the worker computing devices 141, 142 and 143, of local copies of the states, such as the states 191, 192, 193, 194 and 195, respectively, can enable the system 100 to respond to user queries more quickly and efficiently, even if the states needed to be referenced are very large, since, especially in the case of very large states, no time is lost in the worker computing devices having to obtain the state from a centralized persistent storage, such as the centralized persistent storage 180. Nevertheless, the centralized persistent storage can offer redundancy and additional advantages, since, as will be recognized by those skilled in the art, by centralizing storage to one location, additional resources can be invested, in an efficient manner, to ensure that such storage is, indeed, persistent. For example, redundant power supplies, redundant physical storage media and other like techniques can be utilized, which could not efficiently be applied to each worker computing device. Additionally, as will be described in further detail below, a centralized persistent storage, such as the centralized persistent storage 180, can enable a more efficient changing of the affinitization of any one of the worker computing devices, such as the worker computing devices 141, 142 and 143, to any one of the states, such as the states 191, 192, 193, 194 and 195.

One or more "crawler" computing devices, such as the crawler computing devices 161, 162 and 163 can seek out information available via the network 101, such as through the network-based information repositories and services 121 and 122, that is relevant to one or more of the states 191, 192, 193, 194 and 195. When the crawler computing devices 161, 162, or 163, or any combination thereof, obtain such information, they can identify the worker computing device affinitized with the state to which such information is relevant, and they can also provide the obtained information to the identified worker computing device. Additionally, when the crawler computing devices 161, 162, or 163, or any combination thereof, obtain such information, they can also provide such information to the persistent storage 180.

In one embodiment, "coalescer" computing devices, such as the coalescer computing devices 171 and 172 can maintain the states 181, 182, 183, 184 and 185 stored in the persistent storage 180 in the same manner as the states 191, 192, 193, 194 and 195 are maintained by the worker computing devices 141, 142 and 143, respectively. Thus, as information is received that can be relevant to any one of these states, such as from the client computing device 110, or via one or more of the crawler computing devices 161, 162, or 163, the worker computing device affinitized with the state to which such information is relevant can be provided with such information and can, via known processing algorithms, incorporate such new information into the state. Such new information can also be provided to the persistent storage 180 and one or more of the coalescer computing devices can, via the same known processing algorithms, incorporate such new information into the state as stored in the persistent storage 180.

In a further embodiment, the coalescer computing devices, such as the coalescer computing devices 171 and 172, can analyze the states maintained in the persistent storage 180 and can derive therefrom second-order data that can then further be stored into those states. For example, the coalescer computing devices can utilize facial recognition algorithms to identify individuals in photographs that may already be part of one or more states. The identification of such individuals can then be second-order data that can be further added to those states. When the coalescer computing devices, such as the coalescer computing devices 171 and 172, derive such second-order data, they can also be provided to the worker computing device affinitized with the state from which such information was derived, and to which such information is relevant.

In one embodiment, a management computing device 140 can oversee the worker computing devices, such as the worker computing devices 141, 142 and 143, to, for example, maintain optimal efficiency in processing. The management computing device 140 can determine that the states 191, 192, 193, 194 and 195 are improperly distributed among the worker computing devices 141, 142 and 143, and can, as a result, instruct the worker computing devices to affinitize themselves with different states. In such a case, the worker computing device that is no longer affinitized with a particular state can merely discard that state from its local storage, while the worker computing device that is newly affinitized with a particular state can download such a state from the persistent storage 180.

In one embodiment, a "state" can comprise all relevant data, such as all data associated with a specific user, all data associated with a specific task, or other like amalgamations of data. The "state" can further comprise all relevant and computer-executable instructions, settings, and other like programmatic constructs. Thus, it is contemplated that the states, such as the states 181-185 and 191-195 illustrated in the system 100 of FIG. 1, comprising an amount of data that is too large to be transferred from a centralized persistent storage, such as the persistent storage 180, to individual worker computing devices, such as the worker computing devices 141, 142 and 143, on an as-needed basis. Thus, in such an embodiment, changing the affinitization of the worker computing devices 141, 142 and 143, would not be performed dynamically.

Figure 2:
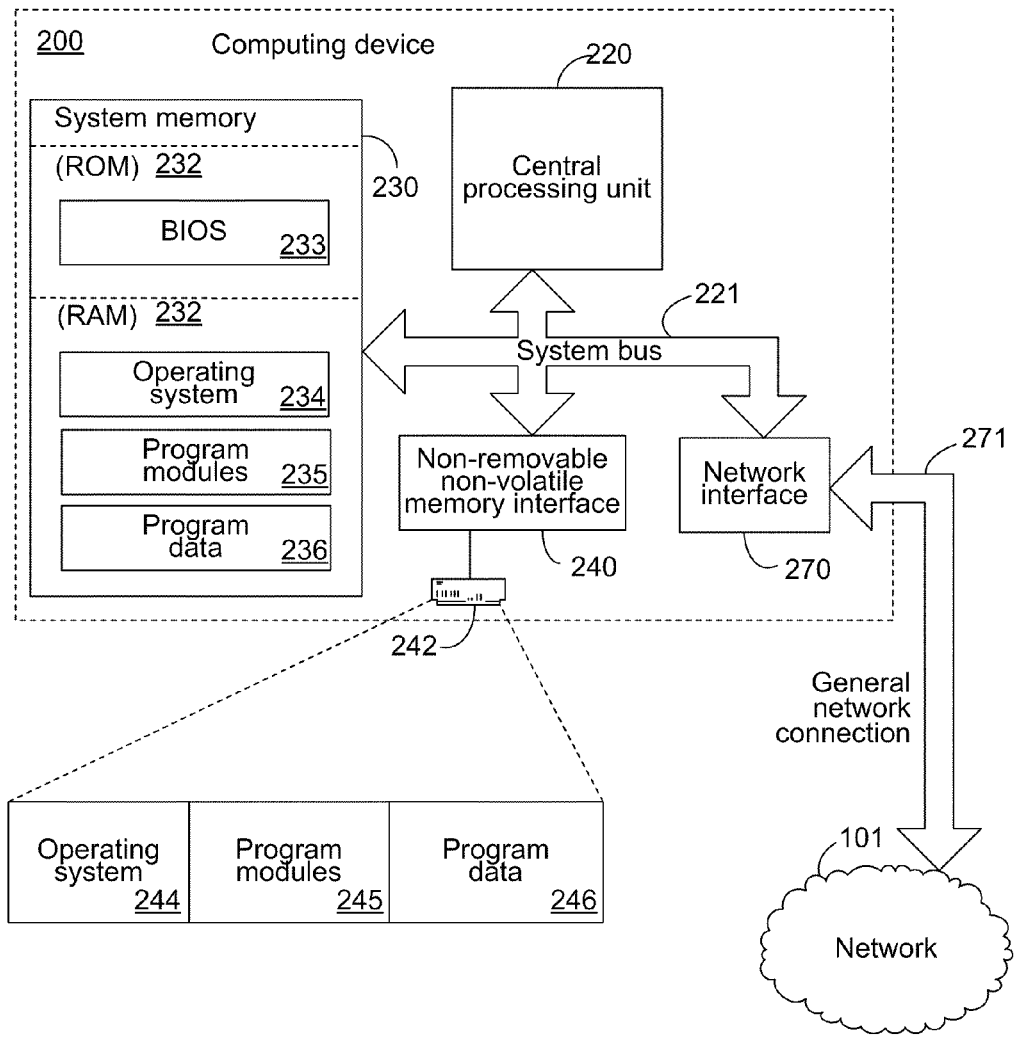
FIG. 2 is a block diagram of an exemplary computing device.

Before proceeding with descriptions of exemplary operations that can be performed by the system 100 of FIG. 1, a detailed description of an exemplary computing device, such as would be applicable for any one or more of the computing devices is illustrated in FIG. 1, and described in detail above, is provided with reference to FIG. 2. Turning to FIG. 2, the exemplary computing device 200 of FIG. 2 can include, but is not limited to, one or more central processing units (CPUs) 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures.

The computing device 200 also typically includes computer readable media, which can include any available media that can be accessed by computing device 200 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 200. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computing device 200, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, other program modules 235, and program data 236.

The computing device 200 may also include other removable/non-removable, volatile/nonvolatile computer storage media. By way of example only, FIG. 2 illustrates a hard disk drive 242 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 242 is typically connected to the system bus 221 through a non-removable memory interface such as interface 240.

The drives and their associated computer storage media discussed above and illustrated in FIG. 2, provide storage of computer readable instructions, data structures, program modules and other data for the computing device 200. In FIG. 2, for example, hard disk drive 242 is illustrated as storing operating system 244, other program modules 245, and program data 246. Note that these components can either be the same as or different from operating system 234, other program modules 235 and program data 236. Operating system 244, other program modules 245 and program data 246 are given different numbers hereto illustrate that, at a minimum, they are different copies.

Additionally, the computing device 200 may operate in a networked environment using logical connections to one or more remote computers. For simplicity of illustration, the computing device 200 is shown in FIG. 2 to be connected to a network 101 that is not limited to any particular network or networking protocols. The logical connection depicted in FIG. 2 is a general network connection 271 that can be a local area network (LAN), a wide area network (WAN) or other network. The computing device 200 is connected to the general network connection 271 through a network interface or adapter 270 which is, in turn, connected to the system bus 221. In a networked environment, program modules depicted relative to the computing device 200, or portions or peripherals thereof, may be stored in the memory of one or more other computing devices that are communicatively coupled to the computing device 200 through the general network connection 271. It will be appreciated that the network connections shown are exemplary and other means of establishing a communications link between computing devices may be used.

Figure 3:
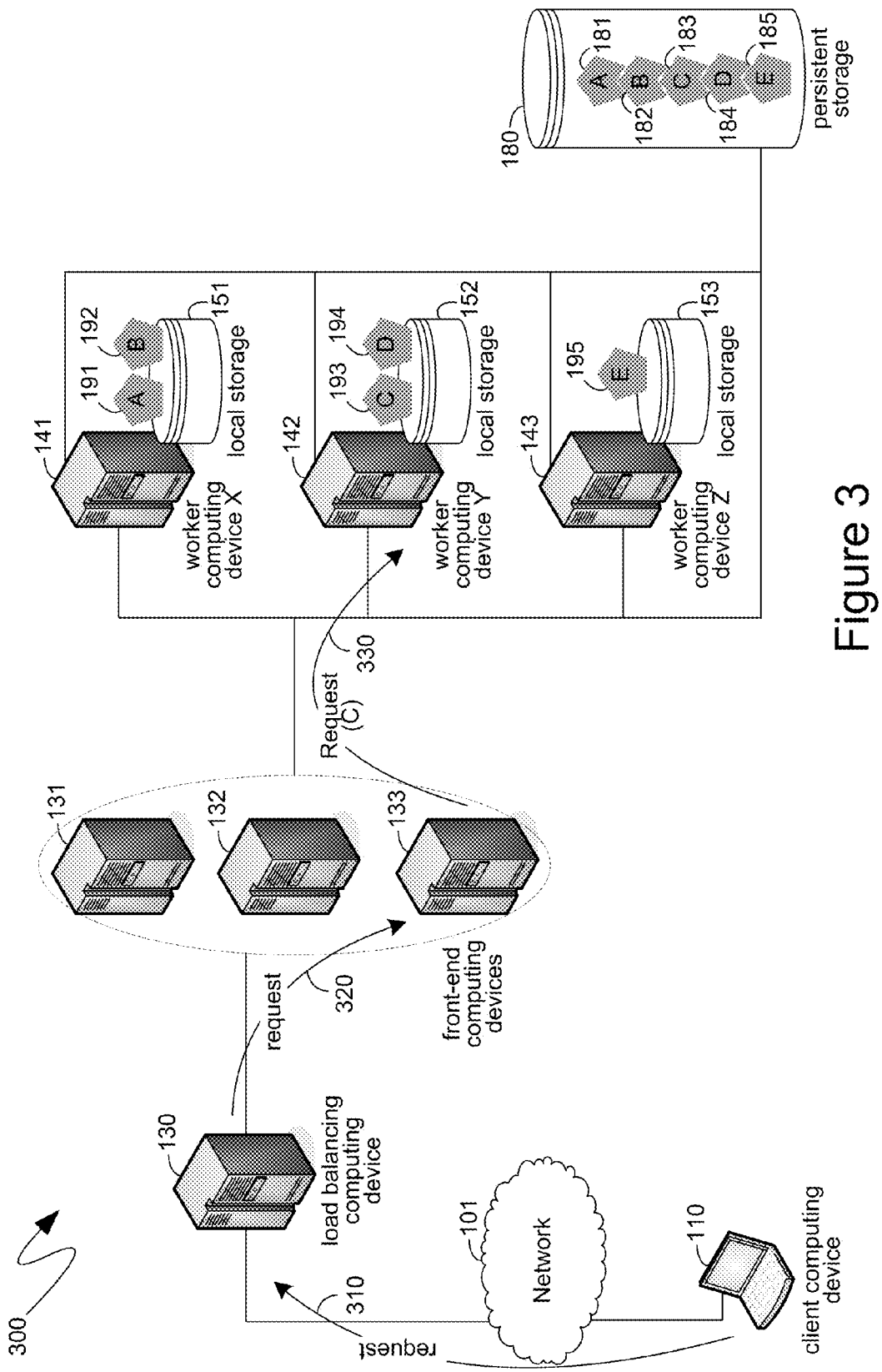
FIG. 3 is a block diagram of an exemplary system for receiving and responding to requests.

Turning to FIG. 3, the system 300 shown therein illustrates a portion of the system 100 shown in FIG. 1 and described in detail above. Additionally, the system 300 of FIG. 3 illustrates an exemplary series of communications by which a request 310 from the client computing device 110 can be directed to the correct worker computing device 142. More specifically, as shown in the system 300 of FIG. 3, a request 310 that can require access to a state, such as the state 193, to respond to, can be directed by the client computing device 110 to a system comprising state affinitized computing devices. In one exemplary embodiment, such a request 310 can initially be received by a load-balancing computing device 130. In such an embodiment, the load-balancing computing device 130 can identify one or more of the front-end computing devices, such as the front-end computing devices 131, 132 and 133, that may not currently be experiencing substantial communicational traffic. The load-balancing computing device 130 can then route the request 310, as the re-routed request 320, to an identified front-end computing device, such as, for example, the front-end computing device 133, as shown in the system 300 FIG. 3.

Upon receiving a request, such as the request 320, a front-end computing device, such as the front-end computing device 133, can associate the request 320 with a particular state, such as the state 193 in the illustrated example shown in FIG. 3. For example, in one embodiment, the request 310 from the client computing device 110 can comprise an identifier of the user using the client computing device 110 to submit the request 310. Such an identifier can be a password, a username, account information, or other like identifying information. Such an identifier can then be included in the request 320, which can merely be a forwarded version of the request 310, to the front-end computing device 133. Utilizing such an identifier, and, optionally, an internal database, the front-end computing device 133 can identify the state 193 as being the state associated with the user whose identifier was included with the original request 310 and, from whom, presumably, the request 310 originated. Thus, the request 310 is to be responded to with reference to the data and, potentially, the computer-executable instructions, of the state 193. As such, the front end computing device 133 can forward request 320, now as the request 330, to the worker computing device 142 that is affinitized to the state 193.

Although not specifically illustrated in the system 300 of FIG. 3, the worker computing device 142 is affinitized with the state 193, can reference the state 193, as stored on a local storage 152 that is local to the worker computing device 142, and can, based on the state 193, respond to the request 330. In one embodiment, such a response can first be communicated to a front-end computing device, either the same front-end computing device 133 from which the request 330 was received, or another computing device, such as, for example, can determined by the load-balancing computing device 130, and the response can, from there, ultimately be communicated back to the client computing device 110 and, thusly, to the user.

Figure 4:
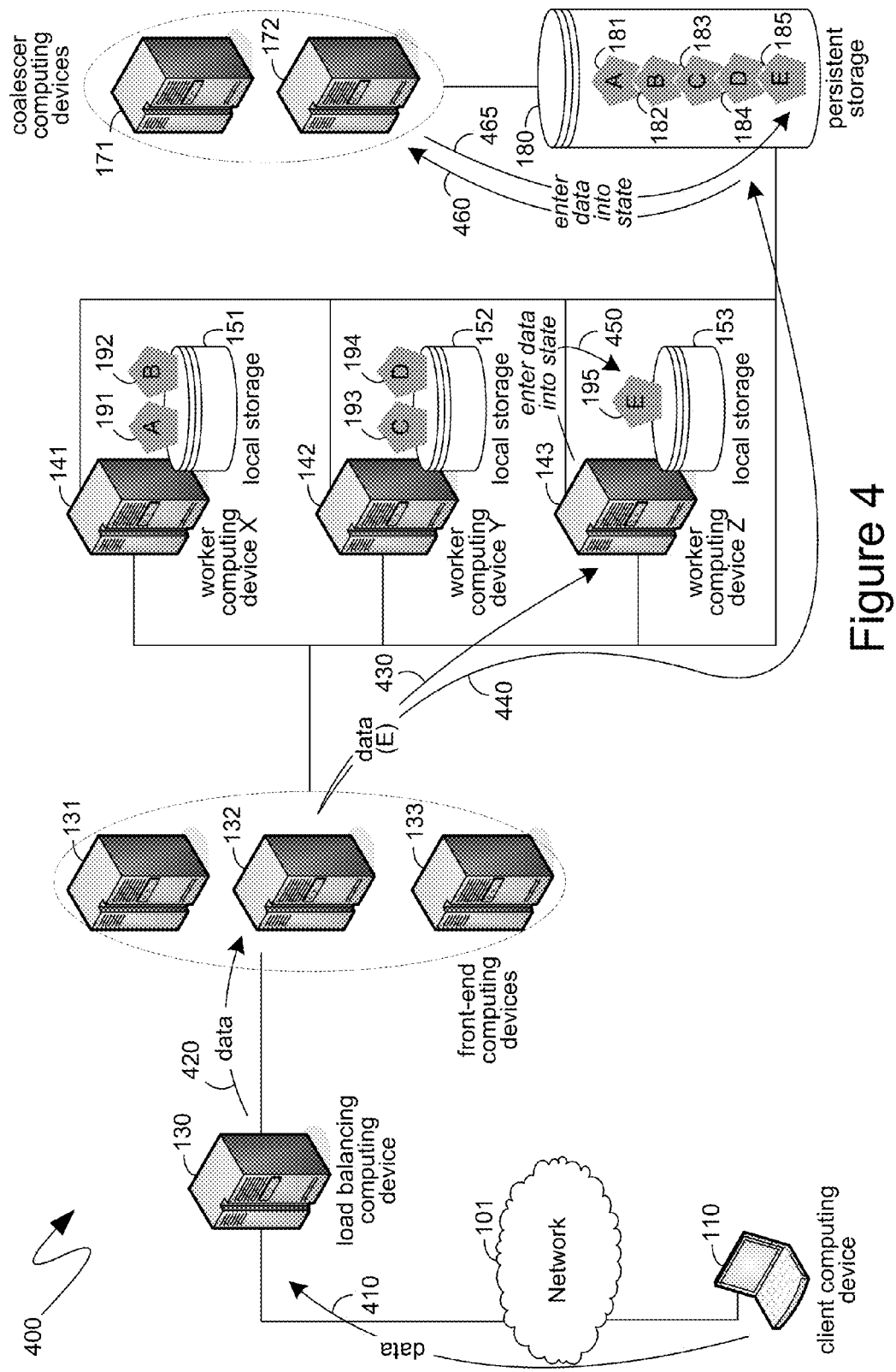
FIG. 4 is a block diagram of an exemplary system for receiving and adding data to states.

In another embodiment, a user of the client computing device 110, rather than submitting a request, such as the request 310, can, instead, provide data, such as data for inclusion with a state associated with that user. Turning to FIG. 4, the system 400 shown therein illustrates an exemplary series of communications by which user-provided data can be added to an existing state that is associated with that user. Initially, a communication 410 comprising the data can be initiated by the client computing device 110 that, for example, the user can be using, to a computing device of the system comprising the state affinitized computing devices. As before, such a computing device can be the load-balancing computing device 130 which can forward the data communication 410, as the data communication 420, to a front-end computing device, such as the front-end computing device 132.

Also as before, the front-end computing device 132 can utilize identifying information that has been provided by, or on behalf of, the user when sending the data via communication 410, to identify a specific state 195 to which the data of the communication 410 is relevant. Once identified, the front-end computing device 132 can send the data, such as via communication 430, to the worker computing device 143 affinitized with the state 195 into which such data is to be integrated. Additionally, the front-end computing device 132 can send the data, such as via communication 440, to the persistent storage 180 that can also retain a copy of the state 195, which is numbered 185 in FIG. 4. In one embodiment, the front-end computing device 132 can first send the data to the persistent storage 180, via the communication 440, and can only provide the data, via communication 430, to the worker computing device 143 affinitized with the state 195 into which the data is to be integrated if the communication 440, providing the data to the persistent storage 180, succeeded.

The worker computing device 143 that is affinitized with the state 195 to which the data provided by the user is relevant can take the data, as received by the communication 430 from the front-end computing device 132, and can enter that data into the state, as indicated by the action 450. The exact mechanism by which such an action 450 can be performed can be dependent upon the manner in which the state 195 is maintained.

Additionally, in one embodiment, coalescer computing devices, such as the coalescer computing devices 171 and 172, can maintain the states 181, 182, 183, 184 and 185 of the persistent storage 180 such that, when new data is received, such as, for example, via communication 440, the one or more coalescer computing devices 171 and 172 can obtain that data and enter it into the relevant state 185, as shown by the communications 460 and 465, utilizing equivalent mechanisms to those utilized when action 450 was performed by the worker computing device 143. For example, the communication 460 can be a notification communication informing one or more of the coalescer computing devices, such as the coalescer computing devices 171 and 172, that data was received for integration into one or more states, such as via the communication 440. Prior to integration by a coalescer computing device, such as the coalescer computing devices 171 or 172, data to be integrated into a state, such as the data received by communication 440, can be retained with the state in a larger container object, such as a data "blob". After integration, the newly received data can be moved into the state. Alternatively, the state can merely comprise an index of data otherwise contained in the blob. In such an alternative embodiment, the above references to "integration" can be nothing more than the indexing of the newly received data in the state master index file. In such a manner, the states 181, 182, 183, 184 and 185 retained by the persistent storage 180 can remain in parity with the states 191, 192, 193, 194 and 195 as stored on the local storage 151, 152 and 153, respectively.

In one embodiment, rather than receiving data to be entered into a state from the user associated with such a state, one or more crawler computing devices, such as the crawler computing devices 161, 162 and 163 shown in FIG. 1, can be utilized to monitor network-based information repositories and services that can be relevant to the user, or to one or more of the states, and automatically obtain information from such network-based information repositories and services when new data is posted thereto. The exact network-based information repositories and services that are monitored can either be those identified by the user, such as during a registration process with the front-end servers, or can be those empirically, or algorithmically, derived, such as based on other data already in the states.

Figure 5:
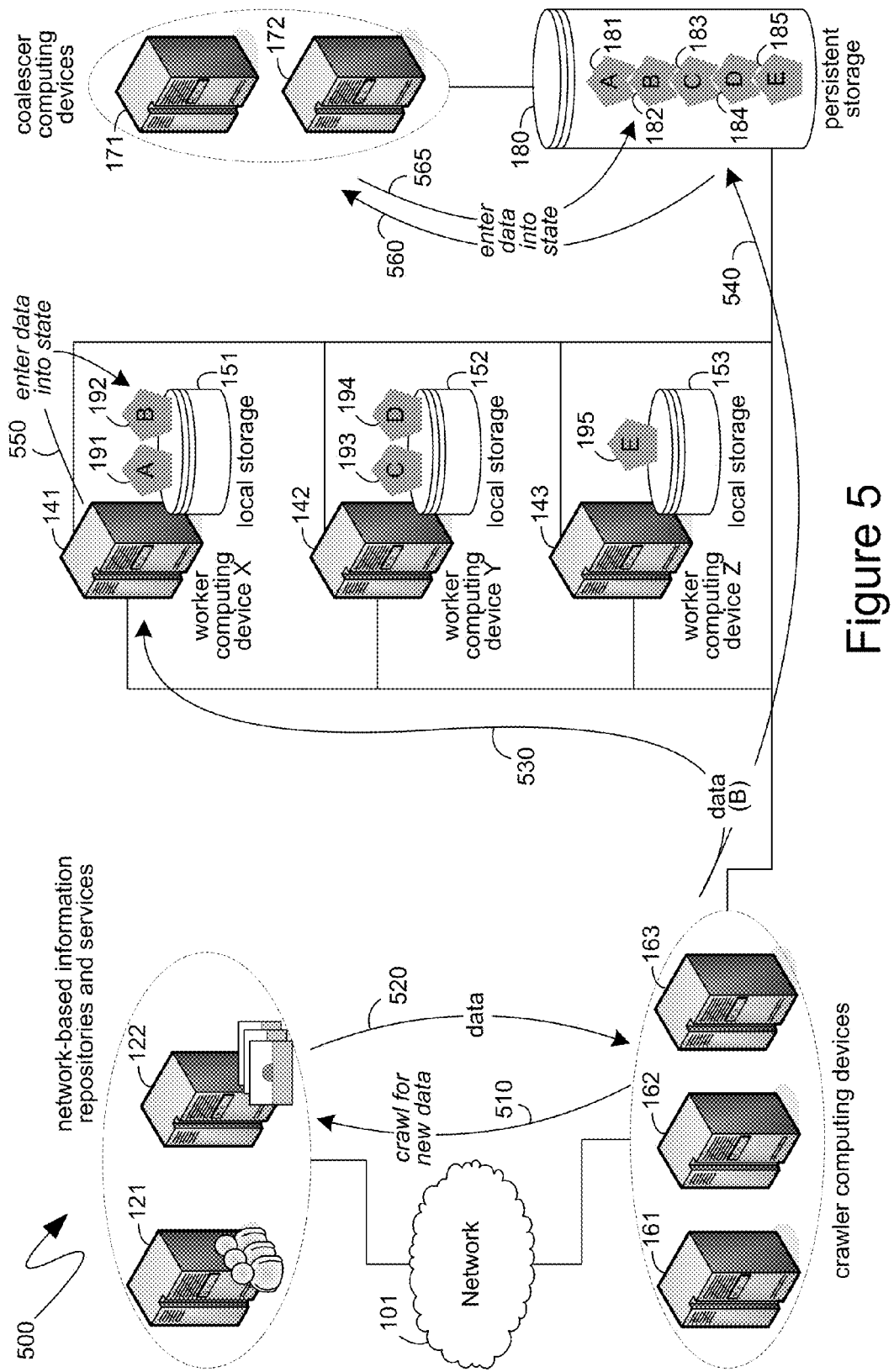
FIG. 5 is a block diagram of an exemplary system for crawling for, receiving and adding data to states.

Turning to FIG. 5, the system 500 shown therein illustrates an exemplary series of communications by which data obtained by the crawler computing devices 161, 162 and 163 can be incorporated into the states. Thus, as shown, one or more of the crawler computing devices 161, 162, or 163 can crawl for new data, as indicated by the action 510, at one or more of the network-based information repositories and services 121 and 122. In the illustrated example of FIG. 5, the network-based information repository and service 121 can be a social networking service, while the network-based information repository and service 122 can be a photographic repository. New data uploaded to such network-based information repository and services 121 or 122 can be obtained, as a result of the crawling 510, by the data communication 520.

In one embodiment, rather than routing additional communications via the front-end servers, the crawler computing devices 161, 162 and 163 can comprise sufficient information to identify the specific state 192 to which the data received via communication 520 is relevant. Consequently, as shown by the communication 530, the crawler computing devices 161, 162, or 163, can direct data they obtained, such as via communication 520, to the worker computing device 141 affinitized with the state 192 to which such data is relevant. In addition, in one embodiment, the crawler computing devices 161, 162 and 163 can send a further communication 540, comprising the same data as the communication 530, to the persistent storage 180. As before, in one embodiment, the communication 540, providing the data to the persistent storage 180, can be performed first, and the communication 530, providing the data to the worker computing device 141 affinitized with the state 192 to which such data is relevant, can only be performed if the communication 540 was successful.

Upon receiving the data with the communication 530, the worker computing device 141 can enter that data into the state 192, as indicated by the action 550, which can be analogous to the action 450 described in detail above. Similarly, one or more of the coalescer computing devices 171 and 172 can obtain the newly received data, and enter it into the state 182, which corresponds with the state 192, via the communications 560 and 565, which can be analogous to the communications 460 and 465 described in detail above.

Figure 6:
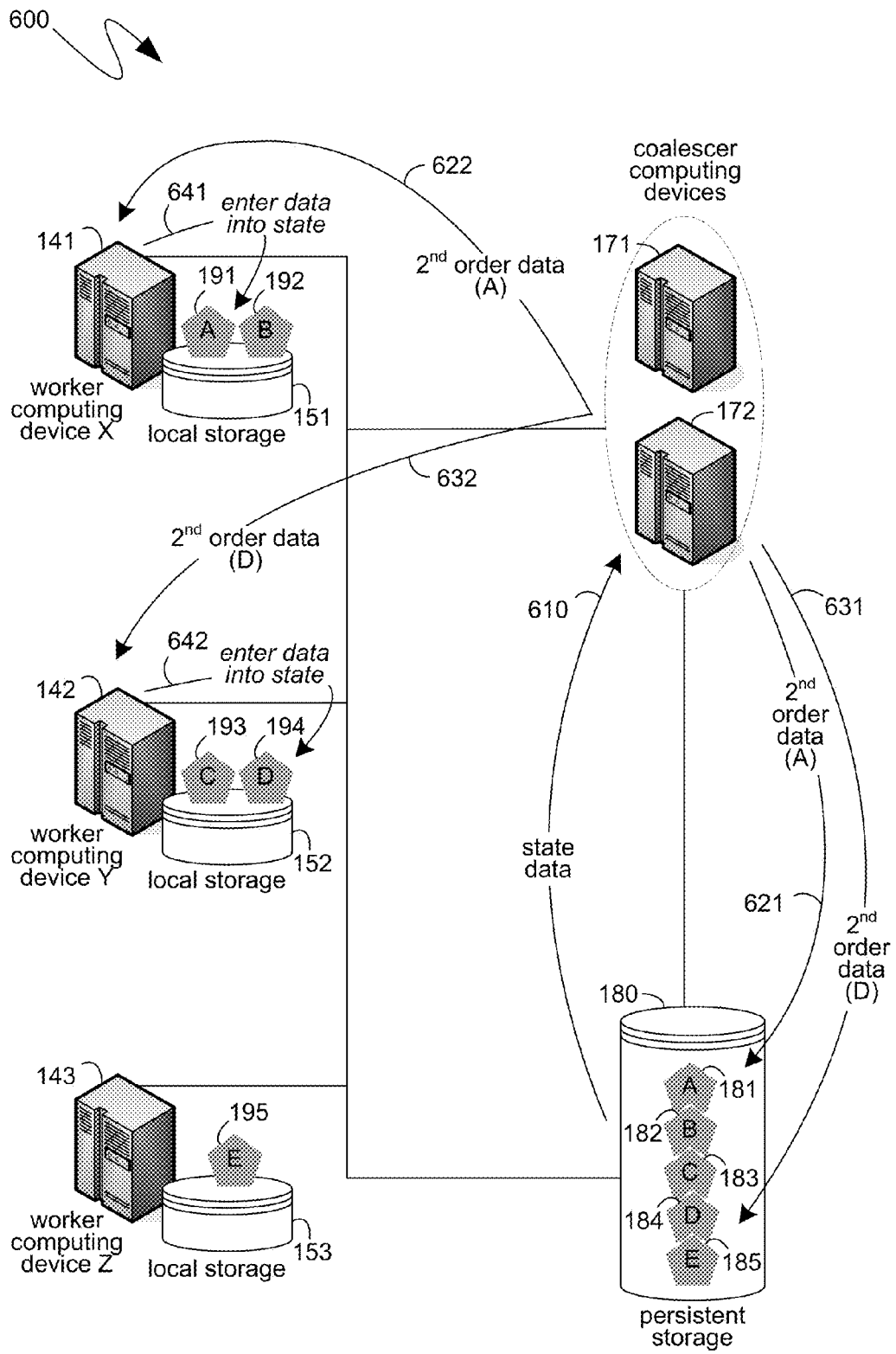
FIG. 6 is a block diagram of an exemplary system for deriving second order data and adding the derived second order data to states.

In one embodiment, in addition to entering data received from external sources into the states 181, 182, 183, 184 and 185 maintained by the persistent storage 180, the coalescer computing devices 171 and 172 can also examine such data and derive therefrom second-order data, or derivative data, that can then be entered back into the relevant states. Turning to FIG. 6, the system 600 illustrates an exemplary series of communications by which the coalescer computing devices 171 and 172 can generate second order data and provide it to the states, both in the persistent storage and the local storage of the worker computing devices.

Initially, as shown by the system 600 of FIG. 6, the coalescer computing devices 171 and 172 can obtain the data of one or more of the states 181, 182, 183, 184, or 185, such as via the communication 610. Subsequently, the coalescer computing devices 171 and 172 can process such obtained data, and derive therefrom second order data, which can then be entered into the relevant states. Thus, as shown by particular example of the system 600 of FIG. 6, the coalescer computing devices 171 and 172 can have derived second order data relevant to the states 181 and 184. Such second order data can be entered into the states 181 and 184 via the communications 621 and 631, respectively.

In addition, the derived second-order data can also be provided, by the coalescer computing devices 171 and 172, to the one or more worker computing devices affinitized with the relevant states. Thus, as shown by particular example of the system 600 of FIG. 6, the coalescer computing devices 171 and 172 can also send the second order data to the worker computing devices 141 and 142 via communications 622 and 632, respectively. Upon receipt of such second-order data, the worker computing devices 141 and 142 can enter that data into the relevant states, as shown by the actions of 641 and 642. As before, the entry of data into a state as performed by a worker computing device can be equivalent to the entry of data into a state as performed by a coalescer computing device.

As will be recognized by those skilled in the art, the coalescer computing devices 171 and 172 can, in essence, perform postprocessing on the data retained in the states in the persistent storage 180, such that simple processing, such as, for example, the addition of data into a state, can be performed by the worker computing devices 141, 142 and 143, while maintaining the states locally, while more complex processing, such as, for example, the derivation of second-order data, can be performed by the coalescer computing devices 171 and 172 after the fact. For example, the worker computing devices 141, 142 and 143 can add information to the states with which they are affinitized regarding newly added photographs that were added to a photograph sharing service. While the coalescer computing devices 171 and 172 can, likewise, add such information to the states in the persistent storage 180, they can, further, process those photographs to derive second order information therefrom, including, for example, facial recognition, spatial recognition, GPS-location-information based mapping, and other like derived information. Such second-order information can then be further added to the states, both in the persistent storage 180, and in the local storage 151, 152 and 153.

Figure 7:
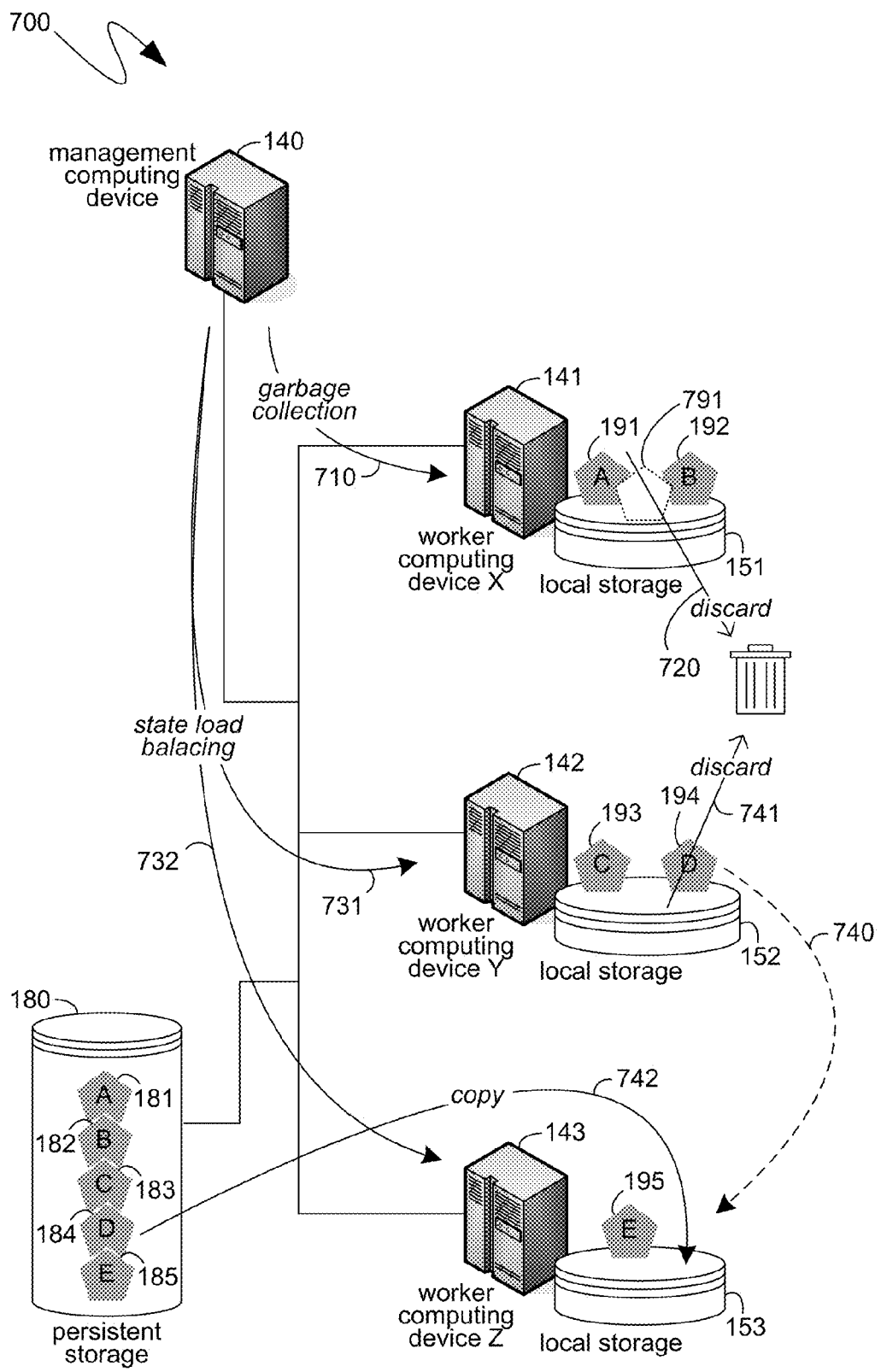
FIG. 7 is a block diagram of an exemplary system for changing which worker computing device is affinitized with which state.

In one embodiment, a management computing device 140, shown in FIG. 1, can seek to maintain optimal performance of worker computing devices, such as the worker computing devices 141, 142 and 143 by changing which states are affinitized with which worker computing devices to ensure that no one worker computing device is affinitized with states that are disproportionately difficult to maintain or are disproportionately active. Turning to FIG. 7, the system 700 shown therein illustrates an exemplary series of communications and actions that can occur in changing the affinitization on one or more of the worker computing devices 141, 142 and 143.

More specifically, as shown by the exemplary system 700 of FIG. 7, a management computing device 140 can perform state load balancing by, for example, moving the affinitization of the state 194 from the worker computing device 142 to the worker computing device 143. For example, the management computing device 140 can send a communication 731 to the worker computing device 142 and instruct the worker computing device to simply discard the state 194. In response, the worker computing device 142 can perform the discard action 741 to remove the state 194 from its local storage 152. The management computing device 140 can also send a communication 732 to the worker computing device 143 informing the worker computing device 143 that it is now affinitized with the state 194. As a consequence of receiving the communication 732, the worker computing device 143 can copy the state 184, corresponding to the state 194, from the persistent storage 180, as indicated by the action 742, to the local storage 153 of the worker computing device 143. The net result, as will be seen by those skilled in the art, is that the affinitization of the state 194, and, indeed, its local storage, was moved from the worker computing device 142, and the local storage 152, to the worker computing device 143, and the local storage 153, as illustrated by the effective action 740.

Additionally, the management computing device 140 can also perform other management tasks. For example, the management computing device can monitor the data stored in the states, both in the persistent storage 180 and locally at the worker computing devices 141, 142 and 143 to ensure that data is not retained beyond an "expiration date" that can be automatically set for data known to become "out-of-date" quickly, or that can be set manually, such as part of a retention policy. In another embodiment, such pruning of the states themselves can be performed by one or more of the coalescer devices, such as the coalescer devices 171 and 172, shown in FIG. 6. In such an alternative embodiment, the pruning performed by the coalescer devices on the states maintained in the persistent storage 180 can be propagated to the states maintained locally by the worker computing devices 141, 142 and 143 in the same manner as the second-order data described above and illustrated in FIG. 6. As another example of the kinds of management tasks that can be performed by the management computing device 140, such a computing device can, as shown in the system 700 of FIG. 7, perform garbage collection 710 on a worker computing device 141. In one embodiment, the garbage collection 710 can comprise instructing the worker computing device 141 to discard, as shown by the action 720, left over states, or data associated with such states, such as the state 791, with which the worker computing device 141 is no longer affinitized. In another embodiment, garbage collection can be performed strictly by processes executing on a worker computing device. For example, rather than the management computing device 140 monitoring the worker computing devices 141, 142 and 143, and instructing them to perform garbage collection, processes executing individually on each one of the worker computing devices, such as the worker computing devices 141, 142 and 143, can perform a similar sort of monitoring and initiate, on their own, a garbage collection process on each worker computing device on an as-needed basis.

Figure 8:
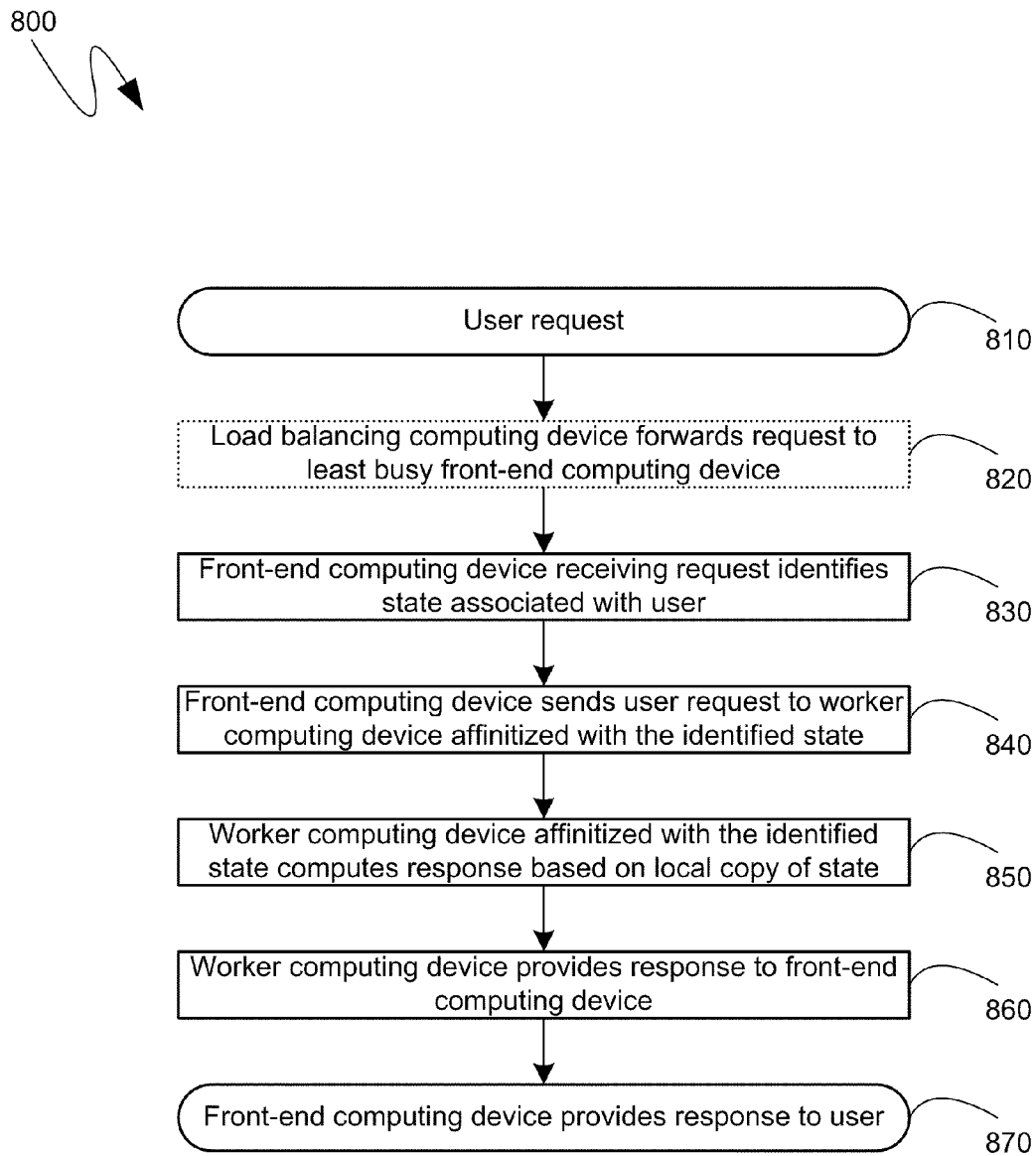
FIG. 8 is a flow diagram of receiving and responding to requests.

Turning to FIG. 8, the flow diagram 800 shown therein illustrates an exemplary series of steps that can be performed by a state affinitized system, such as that described and illustrated in detail above, to respond to a user request. Initially, as shown in the flow diagram 800 of FIG. 8, a user request can be made at step 810. Subsequently, as an optional step 820, signified by the dashed border, a load-balancing computing device can identify a least busy front end computing device and can forward the request, from step 810, to that computing device, at step 820. At step 830, the front-end computing device receiving the request at step 820, can identify a state that is relevant to the request. In one embodiment, the identification of the relevant state, at step 830, can be based on an identification of the user making the request at step 810.

Once the front-end computing device has identified, at step 830, the state upon which a response to the user's request is to be based, the front-end computing device can proceed, at step 840, to send the user's request to the worker computing device that is affinitized with the identified state. At step 850, the worker computing device affinitized with the identified state can reference that state and, utilizing the data, and, potentially, the computer executable instructions, contained within the state, the worker computing device can compute a response. At step 860, the worker computing device can provide the response that was computed at step 850 to a front-end computing device, and, at step 870, the relevant processing can end when the front-end computing device provides the response to the user.

Figure 9:
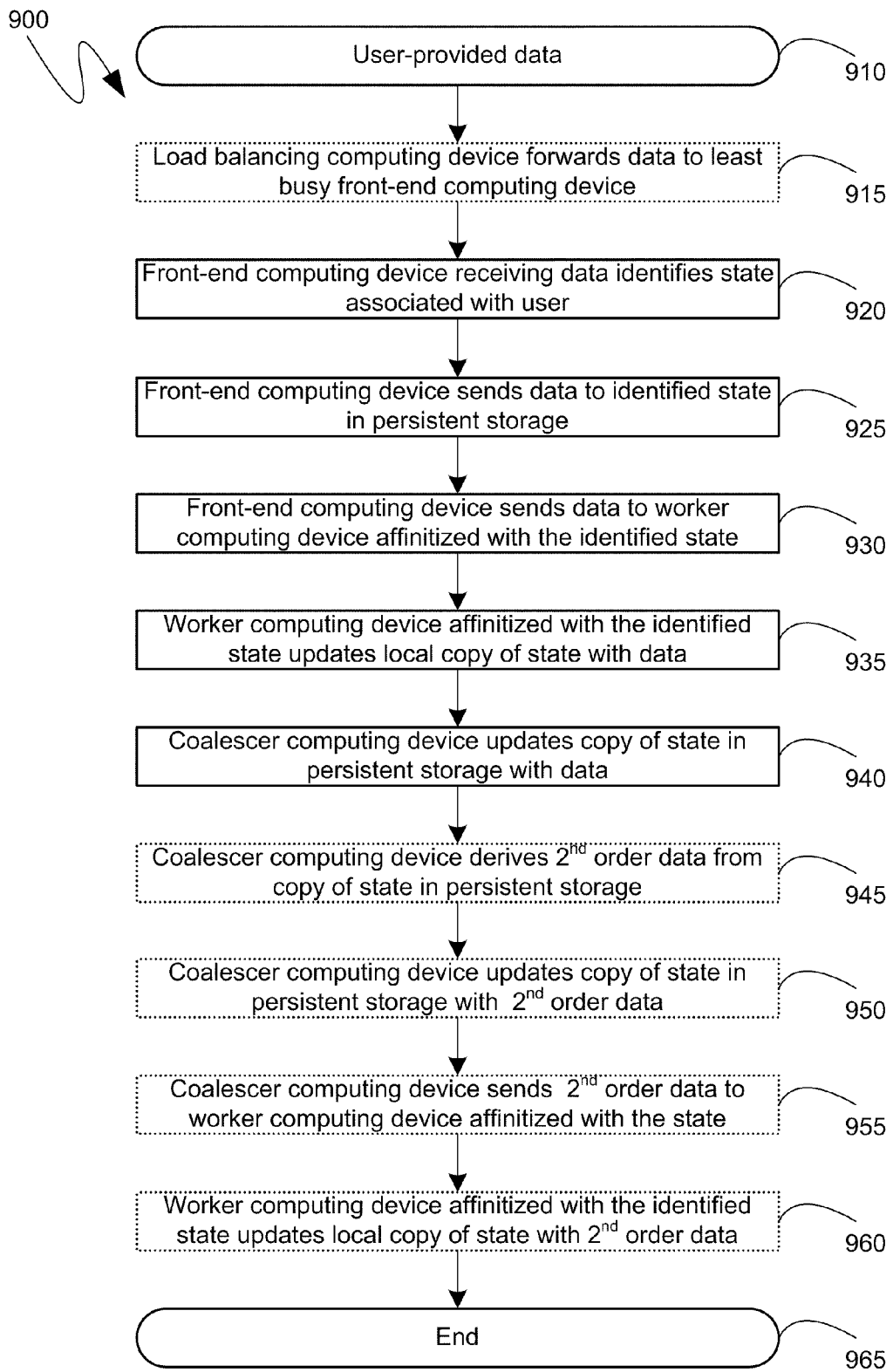
FIG. 9 is a flow diagram of receiving and adding data to states.

Turning to FIG. 9, the flow diagram 900 shown therein illustrates an exemplary series of steps that can be performed when data is received from a user. Thus, as shown, initially, at step 910, the user can provide data, such as data to be added to a state associated with that user. Subsequently, at step 915, a load-balancing computing device can forward the user provided data from step 910 to a least busy front-end computing device, in the same manner as described in detail above with reference to step 820. As with step 820, the dashed border indicates that step 915 is also optional.

Upon receiving user provided data, the front-end computing device can, at step 920, in a manner analogous to that described above with reference to step 830, identify a state to which such data is to be added, such as a state with which the user is associated. Subsequently, at step 925, the front-end computing device can send the user provided data to the identified state as it is retained in a centralized persistent storage. Coincidentally with step 925, at step 930, the front-end computing device can also send the data to a worker computing device that is affinitized with the state that was identified at step 920. Alternatively, as detailed above, step 930 need not be performed coincidentally with step 925, and can, instead, be contingent upon step 925 such that the provision of the data to the worker computing device at step 930 can only be performed if the provision of the data to the persistent storage, at step 925, was successful.

At step 935, in response to the receipt of the data at step 930, the worker computing device that is affinitized with the identified state can update its local copy of that state with the data received at step 930. Coincidentally with step 935, at step 940, a coalescer computing device, or other appropriate computing device, can update the copy of the state that is in the centralized persistent storage. Again, in an alternative embodiment, step 940 need not be performed coincidentally with step 935 and can, instead, likely be performed first, since the provision of the data to the persistent storage, at step 925, can have occurred prior to the provision, at step 930, of the data to the worker computing device. As described in detail above, the updating performed by the worker computing device at step 935 can be performed in the same manner as the updating performed by the coalescer computing device at step 940. For example, such an updating can comprise moving the data into the state, or merely updating a state index to include one or more references to the data, however stored.

In one embodiment, the relevant processing can end at step 965. However, in an alternative embodiment, steps 945, 950, 955 and 960 can further be performed. As before, the dashed border of such steps, as shown in the flow diagram 900 of FIG. 9, is provided to indicate that such steps are optional.

After both the local copy of the state, as maintained by the worker computing device affinitized with that state, and the state as maintained by the centralized persistent storage, have both been updated at steps 935 and 940, respectively, at step 945, a coalescer computing device can derive second order data from the copy of the state that is maintained in a centralized persistent storage. If, at step 945, the coalescer computing device does derive some second order data, then, at step 950, the coalescer computing device can update the copy of the state that is maintained in the persistent storage with that second order data. Additionally, at step 955, the coalescer computing device can send the second-order data it derived to the worker computing device that is affinitized with the state from which that second order data was derived. In response to receiving additional data at step 955, the worker computing device can, at step 960, update its local copy of the state with the second order data that was derived by the coalescer computing device at step 945. The relevant processing can then end at step 965.

Figure 10:
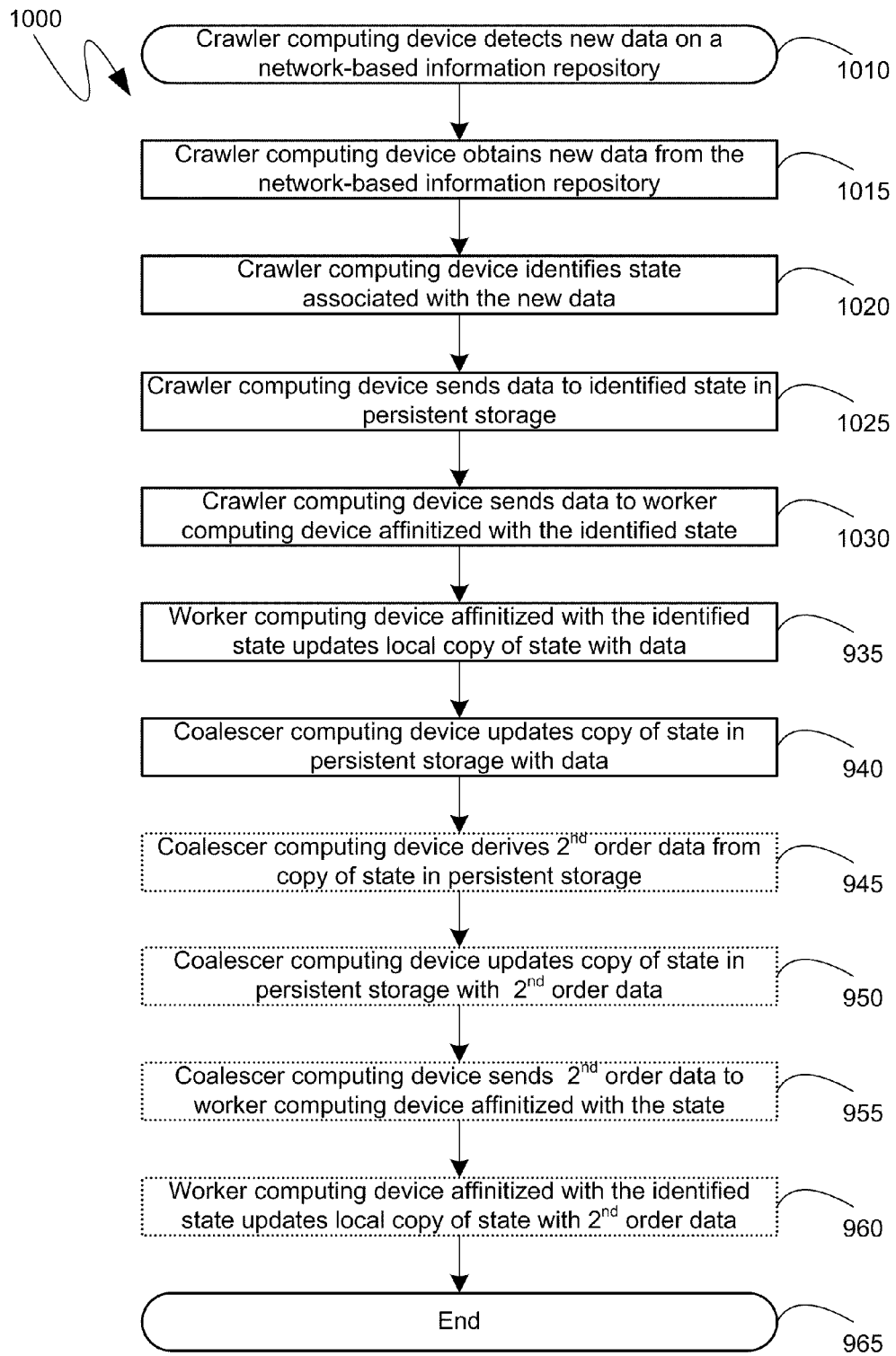
FIG. 10 is a flow diagram of crawling, receiving and adding data to states.

In a manner analogous to that shown by the flow diagram 900 of FIG. 9, the flow diagram 1000 of FIG. 10 illustrates an exemplary series of steps that can be performed when data is received, not from the user, but from one or more crawler computing devices that can have obtained such data from identified, or otherwise relevant, network-based information repositories and services. Initially, at step 1010, a crawler computing device can detect new data on a network-based information repository or service that can be relevant to one or more of the states maintained by the state affinitized system. Subsequently, at step 1015, the crawler computing device can obtain the new data from the network-based information repository or service. At step 1020, the crawler computing device can identify one or more states associated with the newly obtained data. At step 1025, the crawler computing device can send the data to the states identified at step 1020, as they reside in decentralized persistent storage. Coincidentally with step 1025, at step 1030, the crawler computing device can also send the data to one or more worker computing devices that are affinitized with the identified one or more states. As before, rather than performing step 1030 coincidentally with step 1025, step 1030 can, instead, be performed contingent on the success of step 1025. The remainder of the processing can be performed in the same manner as described above and, for ease of description and understanding, steps 935 through 965 are reproduced in the flow diagram 1000 of FIG. 10 bearing the same numeric identifiers as in the flow diagram 900 of FIG. 9. As would be expected, steps having the same numeric identifiers in both FIGS. 9 and 10 are equivalent steps.

Figure 11:
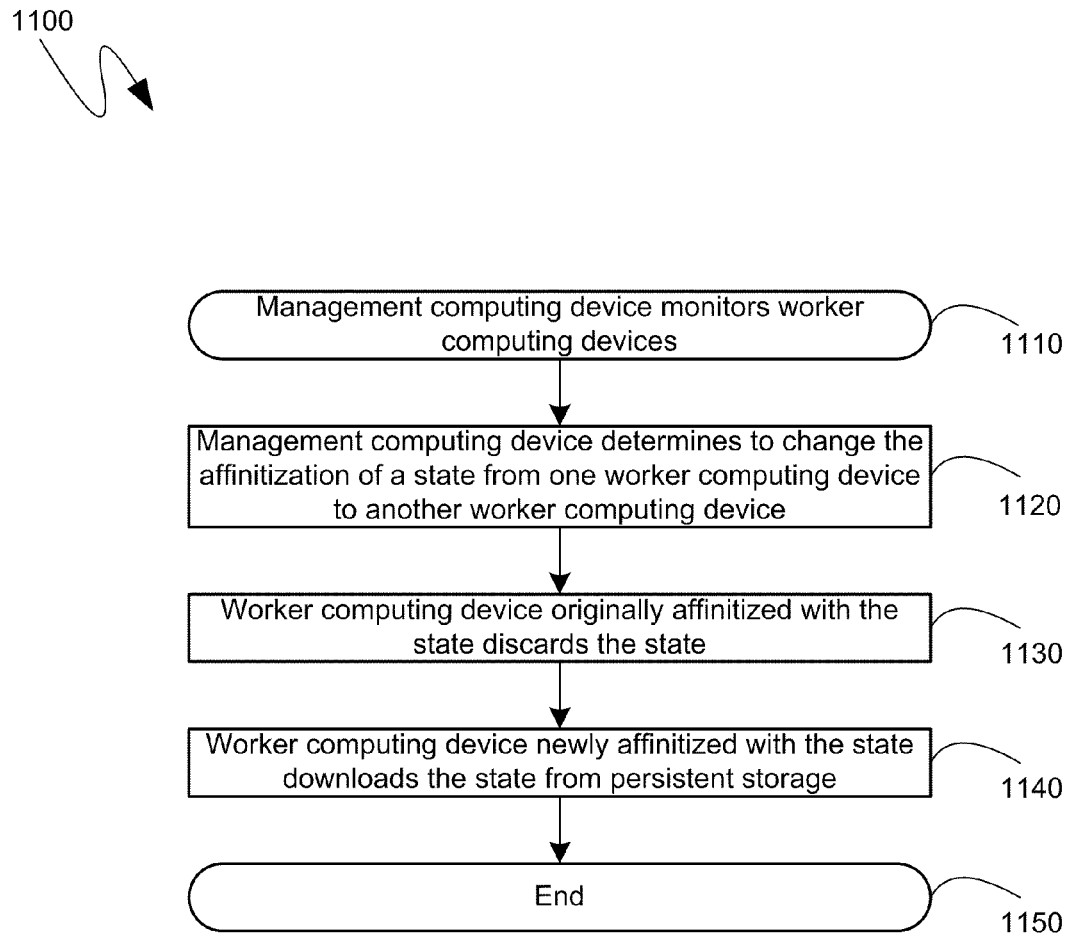
FIG. 11 is a flow diagram of changing which worker computing device is affinitized with which state.

Turning to FIG. 11, the flow diagram 1100 shown therein illustrates an exemplary series of steps that can be performed by the state affinitized system to change which computing devices are affinitized with specific states. Initially, as shown, at step 1110, a management computing device can monitor worker computing devices to ensure that, for example, each worker computing device is operating within its capacity. If the monitoring of the worker computing devices at step 1110 reveals, to the management computing device, that one or more worker computing devices are affinitized with states that require too much of their effort, the manager computing device can determine, at step 1120, to change the affinitization of one or more of those states to another, different, worker computing device. At step 1130, the worker computing device originally affinitized with the state whose affinity is being moved to a different computing device, can discard the state from its local storage. Coincidentally, at step 1140, the worker computing device that is being newly affinitized with the state can download the state from persistent storage. Once step 1140 is completed, the relevant processing can end at step 1150.

While the above descriptions have focused on the processes and operations of specific computing devices, the mechanisms described herein are not limited to processes and operations that must be performed by physically distinct computing devices. Instead, as would be known by those skilled in the art, what has been illustrated as physically distinct computing devices can likewise be implemented, without change to the above described mechanisms, via multiple independent processes on a single computing device. Likewise, a single computing device may operate in accordance with some of the roles described above, but not others and, indeed, the roles played by any one computing device can vary throughout the life of the computing device and any system of which a computing device is a part.

As can be seen from the above descriptions, mechanisms for affinitizing one or more states with one or more computing devices to provide state-based processing of large states have been provided. In view of the many possible variations of the subject matter described herein, we claim as our invention all such embodiments as may come within the scope of the following claims and equivalents thereto.

We claim:
1. A state affinitized system comprising:
 a centralized persistent storage comprising an up-to-date copy of each state maintained by the state affinitized system
 one or more worker computing devices, each of the worker computing devices being uniquely affinitized with one or more states maintained by the state affinitized system and each of the worker computing devices maintaining a copy of the one or more states with which they are uniquely affinitized on storage local to the one or more worker computing devices;
 one or more front-end computing devices providing a front-end interface to users of the state affinitized system, the one or more front-end computing devices performing steps comprising: receiving a request comprising user-identifying information via the front-end interface; determining a state, from among the one or more states maintained by the state affinitized system, that is associated with the request based on the user-identifying information of the request; determining a worker computing device, from among the one or more worker computing devices, that is uniquely affinitized with the determined state; and transmitting the request to the determined worker computing device; and
 a management computing device for monitoring the one or more worker computing devices and, based on the monitoring, changing the affinitization of a first state from a first worker computing device, of the one or more worker computing devices, with which it was originally affinitized to a second worker computing device, also of the one or more worker computing devices, to which it is to be subsequently affinitized, the changing comprising: instructing the first worker computing device to discard a copy of the first state maintained on a first storage local to the first worker computing device; and instructing the second worker computing device to obtain, from the centralized persistent storage, a copy of the first state on a second storage local to the second worker computing device.

2. The system of claim 1, wherein the one or more worker computing devices respond to requests received from the one or more front-end computing devices only with reference to a state, associated with the request, with which the one or more worker computing devices are affinitized and which is maintained on storage local to the one or more worker computing devices.

3. The system of claim 1, further comprising: one or more crawler computing devices obtaining data relevant to at least one of the one or more states maintained by the state affinitized system from network-based information repositories and services, the one or more crawler computing devices identifying the at least one state to which the obtained data is relevant and transmitting the obtained data to the centralized persistent storage and to a worker computing device, from among the one or more worker computing devices, affinitized with the identified at least one state.

4. The system of claim 1, further comprising: a front-end load balancing computing device for balancing a communicational load among the one or more front-end computing devices.

5. The system of claim 1, wherein the management computing device further instructs, based on the monitoring, at least one worker computing device, from among the one or more worker computing devices, to discard data associated with a state that is no longer affinitized with the at least one worker computing device.

6. The system of claim 1, further comprising: one or more coalescer computing devices for maintaining the up-to-date copy of each state in the centralized persistent storage, the maintaining comprising incorporating received information into a state associated with the received information in an equivalent manner to incorporation of received information performed by a worker computing device, from among the one or more worker computing devices, that is affinitized with the state associated with the received information and that also received a copy of the received information.

7. The system of claim 6, wherein the one or more coalescer computing devices further derive second order data from a state, of the one or more states maintained by the state affinitized system, in the centralized persistent storage and incorporate the derived second order data into the state in the centralized persistent storage.

8. The system of claim 7, wherein the one or more coalescer computing devices further transmit the derived second order data to a worker computing device, from among the one or more worker computing devices, that is affinitized with the state, the transmitting causing the worker computing device that is affinitized with the state to incorporate the derived second order data into the state local to the worker computing device in the same manner as the incorporating.

9. The system of claim 1, wherein at least one state maintained by the state affinitized system comprises both data and computer-executable instructions relevant to the processing of the data.

10. One or more computer-readable memory comprising computer-executable instructions for managing a state affinitized system, the computer-executable instructions directed to steps comprising:
    monitoring one or more worker computing devices, each of the worker computing devices being uniquely affinitized with one or more states maintained by the state affinitized system and each of the worker computing devices maintaining a copy of the one or more states with which they are uniquely affinitized on storage local to the one or more worker computing device; and
    based on the monitoring, changing the affinitization of a first state from a first worker computing device with which it was originally affinitized to a second worker computing device to which it is to be subsequently affinitized, the changing comprising: instructing the first worker computing device to discard a copy of the first state maintained on a first storage local to the first worker computing device; and
instructing the second worker computing device to obtain, from a centralized persistent storage, a copy of the first state on a second storage local to the second worker computing device, the centralized persistent storage comprising an up-to-date copy of each state of the one or more states maintained by the state affinitized system.

11. The computer-readable memory of claim 10, further comprising computer-executable instructions for instructing, based on the monitoring, at least one worker computing device, from among the one or more worker computing devices, to discard data associated with a state that is no longer affinitized with the at least one worker computing device.

12. The computer-readable memory of claim 10, further comprising computer-executable instructions for:
    providing a front-end interface to users of the state affinitized system;
    receiving a request comprising user-identifying information via the front-end interface;
    determining a state, from among the one or more states maintained by the state affinitized system, that is associated with the request based on the user-identifying information of the request;
    determining a worker computing device, from among the one or more worker computing devices, that is uniquely affinitized with the determined state, the determined worker computing device comprising a copy of the determined state on storage local to the determined worker computing device; and
    transmitting the request to the determined worker computing device.

13. The computer-readable memory of claim 10, further comprising computer-executable instructions for: maintaining, in the centralized persistent storage, the up-to-date copy of each state of the one or more states maintained by the state affinitized system, the maintaining comprising incorporating received information into a state associated with the received information in an equivalent manner to incorporation of received information performed by a worker computing device, from among the one or more worker computing devices, that is affinitized with the state associated with the received information and that also received a copy of the received information.

14. The computer-readable memory of claim 10, further comprising computer-executable instructions for: deriving second order data from a state, of the one or more states maintained by the state affinitized system, in the centralized persistent storage; and incorporating the derived second order data into the state in the centralized persistent storage.

15. The computer-readable memory of claim 14, further comprising computer-executable instructions for: transmitting the derived second order data, to a worker computing device, from among the one or more worker computing devices, that is affinitized with the state and maintains a copy of the state local to the worker computing device, the transmitting causing the worker computing device that is affinitized with the state to incorporate the derived second order data into the state local to the worker computing device in the same manner as the incorporating.

16. One or more computer-readable memory comprising computer-executable instructions for participating in a state affinitized system, the computer-executable instructions directed to steps comprising:
    maintaining, in a centralized persistent storage, an up-to-date copy of one or more states of the state affinitized system, the maintaining comprising incorporating received information into an state associated with the received information in an equivalent manner to incorporation of received information performed by a worker computing device of the state affinitized system that is uniquely affinitized with the state associated with the received information and that also received a copy of the received information;
    managing, on the centralized persistent storage, the state associated with the received information after the received information has been incorporated into it, the managing comprising at least one of: deriving second order data from the state, or pruning the state to remove outdated data; and notifying a worker computing device, that is affinitized with the state and maintains another copy of the state local to the worker computing device, of changes to the state resulting from the managing, the notifying causing the worker computing device to modify the other copy of the state that is local to the worker computing device so that the other copy of the state and the state on the centralized persistent storage are equivalent.

17. The computer-readable memory of claim 16, further comprising computer-executable instructions for:

monitoring one or more worker computing devices, each of the worker computing devices being uniquely affinitized with one or more states maintained by the state affinitized system and each of the worker computing devices maintaining a copy of the one or more states with which they are uniquely affinitized on storage local to the one or more worker computing device; and based on the monitoring, changing the affinitization of a first state from a first worker computing device with which it was originally affinitized to a second worker computing device to which it is to be subsequently affinitized, the changing comprising: instructing the first worker computing device to discard a copy of the first state maintained on a first storage local to the first worker computing device; and instructing the second worker computing device to obtain, from a centralized persistent storage, a copy of the first state on a second storage local to the second worker computing device, the centralized persistent storage comprising an up-to-date copy of each state of the one or more states maintained by the state affinitized system.

18. The computer-readable memory of claim 16, further comprising computer-executable instructions for:

providing a front-end interface to users of the state affinitized system;

receiving a request comprising user-identifying information via the front-end interface;

determining a state, from among the one or more states maintained by the state affinitized system, that is associated with the request based on the user-identifying information of the request;

determining a worker computing device, from among the one or more worker computing devices, that is uniquely affinitized with the determined state, the determined worker computing device comprising a copy of the determined state on storage local to the determined worker computing device; and transmitting the request to the determined worker computing device.

19. The system of claim 1, wherein the one or more worker computing devices, the one or more front-end computing devices and the management computing device are all separate, physical computing devices.

20. The computer-readable memory of claim 16, wherein the deriving the second order data from the state comprises at least one of:

performing facial recognition, performing spatial recognition, or performing GPS-location-information based mapping.

* * * * *